United States Patent

Prosser

[15] 3,646,819

[45] Mar. 7, 1972

[54] ROTARY POWER TRANSMISSION

[72] Inventor: David G. Prosser, Mequon, Wis.

[73] Assignee: Autotrol Corporation, Milwaukee, Wis.

[22] Filed: Sept. 2, 1970

[21] Appl. No.: 69,056

Related U.S. Application Data

[62] Division of Ser. No. 818,763, Apr. 23, 1969, Pat. No. 3,574,330.

[52] U.S. Cl. .............................. 74/3.5, 74/112, 200/35 R
[51] Int. Cl. ................................................. G05g 21/00
[58] Field of Search ............... 74/112, 3.5, 3.52, 3.54, 435; 200/35 R, 38 R, 38 A, 38 D

[56] References Cited

UNITED STATES PATENTS

| | | | |
|---|---|---|---|
| 2,467,848 | 4/1949 | Newell | 200/38 A |
| 2,976,471 | 3/1961 | Harris | 74/435 X |
| 3,448,625 | 6/1969 | Tischler | 74/3.5 |

*Primary Examiner*—Milton Kaufman
*Attorney*—Thomas O. Kloehn and Thomas W. Ehrmann

[57] ABSTRACT

A power-transmitting gear having a space which interrupts the gear portion is disposed in engagement with a power-driven pinion. A trigger member having a peripheral gear segment is arranged in coaxial relationship on the power-transmitting gear for rotation with the power-transmitting gear and for limited rotation relative to it. A circular spring normally operates to maintain the angular relationship between the power-transmitting gear and the trigger member in a manner that the gear segment on the trigger member is positioned with respect to the gear portion of the power-transmitting member adjacent to one end of the space which separates the gear portion. The power-transmitting gear is provided with a second gear which is adapted to be meshed with a gear formed on the element to be driven. An input force applying member is movably disposed adjacent to the trigger member is operative to apply a force to the trigger member to effect its limited rotation relative to the power-transmitting gear so that the gear segment of the trigger member is moved into meshing engagement with the power-driven pinion. The trigger member being driven by the pinion effects rotation of the power-transmitting gear to mesh the gear portion thereof with the pinion. Thus, the drive from the pinion is transmitted to the power-transmitting gear that in turn operates to drive the element which it is desired to move.

7 Claims, 5 Drawing Figures

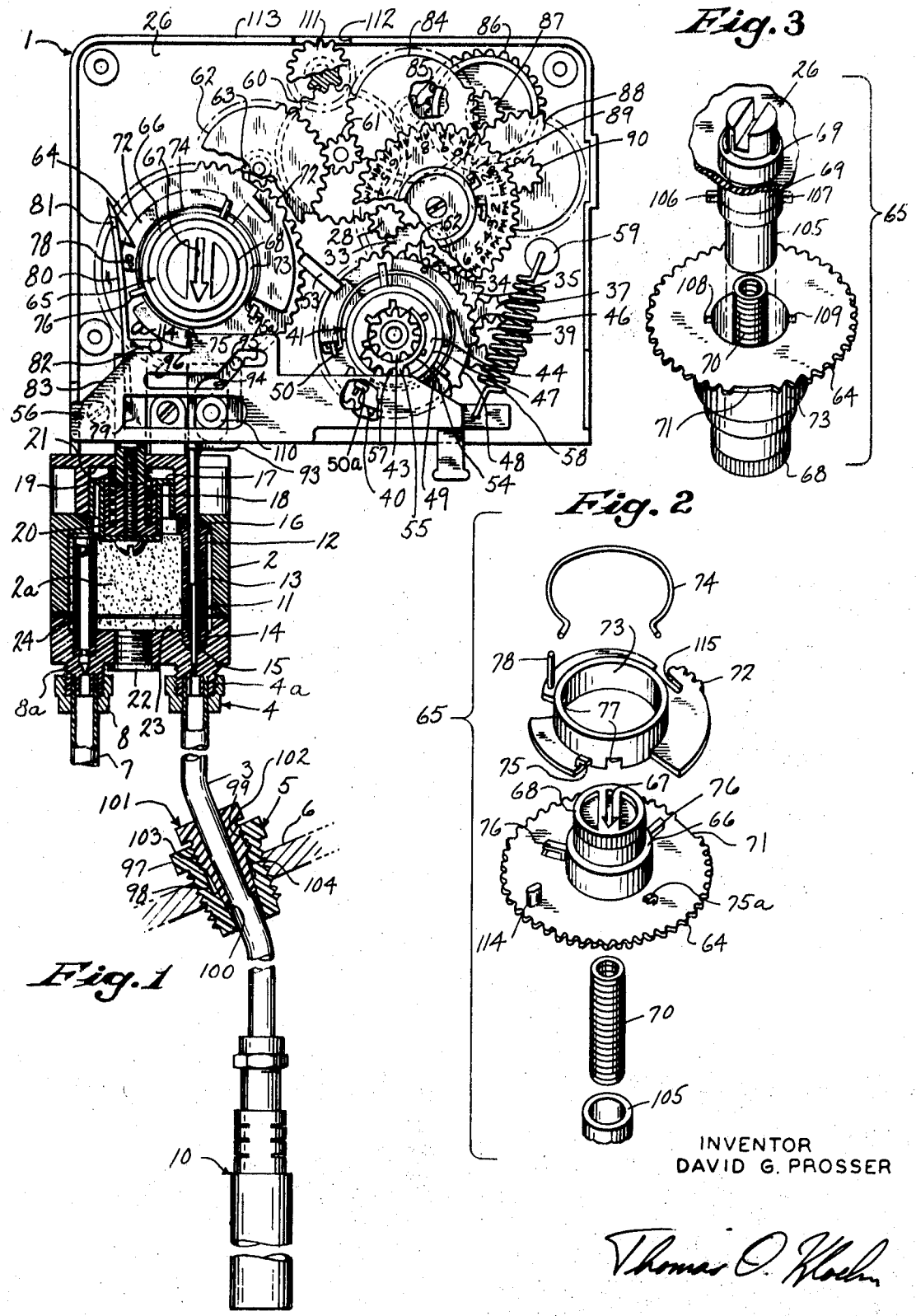

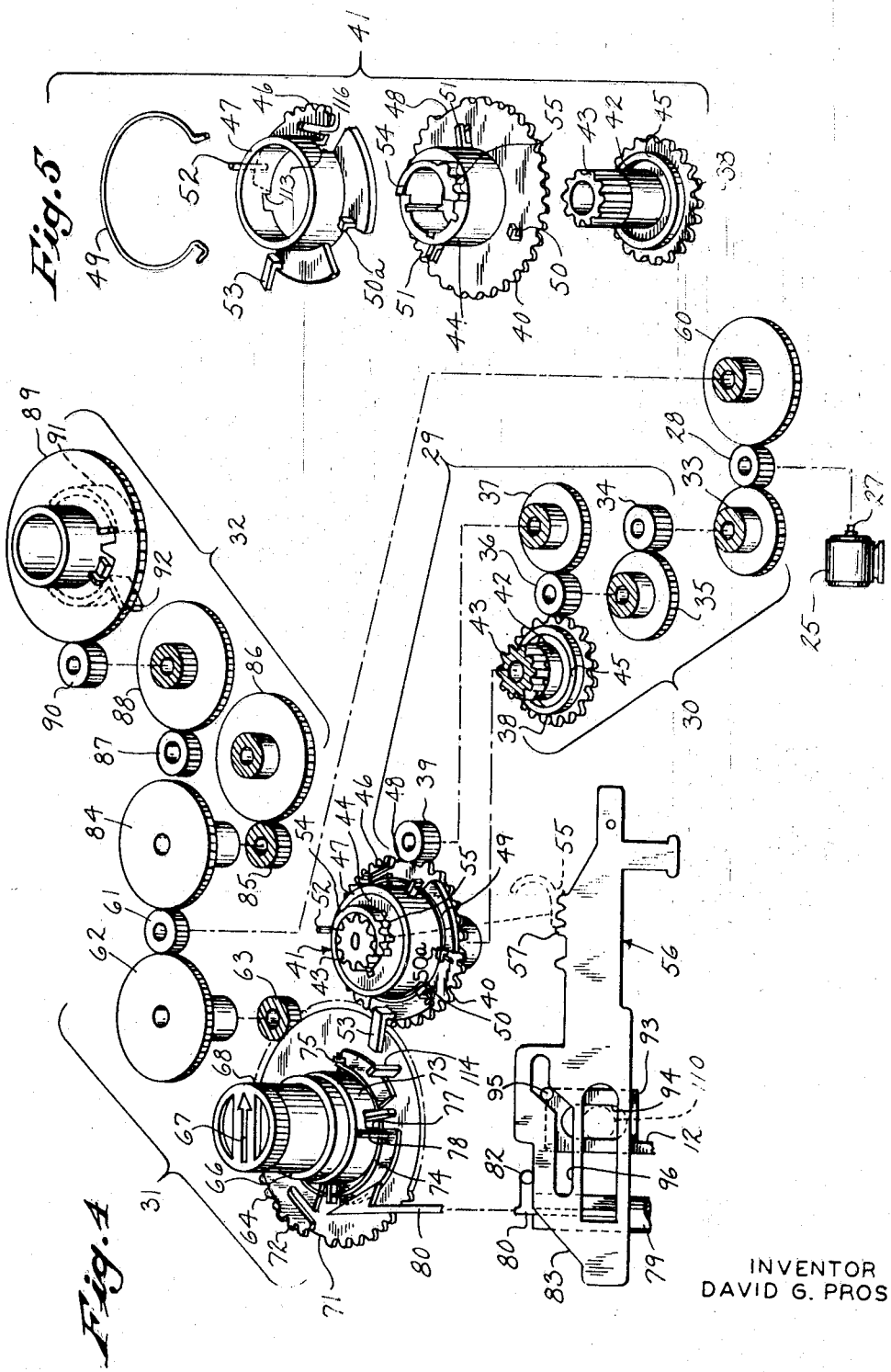

ROTARY POWER TRANSMISSION

CROSS-REFERENCE TO RELATED APPLICATIONS

This is a division of application Ser. No. 818,763, filed Apr. 23, 1969, now U.S. Pat. No. 3,574,330.

BACKGROUND OF THE INVENTION

Generally when it is desired to transmit a drive selectively to a member for effecting a linear or rotary movement of the member, the power drive is selectively connected to the member to be driven by means of a clutch device which is incorporated into the transmission. In utilizing clutch devices for selectively connecting the power drive to the member to be driven mechanical or electrical clutches are utilized. These clutches are relatively costly, somewhat bulky and generally not suitable for applications where a lightweight and compact power transmission is required. Also the mechanical and electrical clutches require additional controls for effecting their operation automatically which also makes them unsuitable for compact, lightweight and relatively inexpensive application. The present invention overcomes the undesireable features outlined above and provides a compact practical transmission which operates automatically to selectively transmit a power drive to a movable member from a constantly operating power source.

SUMMARY OF THE INVENTION

The invention relates to a mechanism for intermittantly transmitting a rotary force responsive to a relatively small mechanical signal, and the components of this mechanism include a rotatable force-transmitting gear segment that has a gap between its ends and that is in driving engagement with a rotating pinion, a trigger gear segment that has substantially the same pitch diameter and tooth configuration as the force-transmitting gear segment and that is mounted coaxially with the force-transmitting gear segment both to rotate with the force-transmitting gear segment and to rotate a limited distance relative to the force-transmitting gear segment into and away from said gap and a trigger member on the trigger gear segment that can be engaged to rotate the trigger gear segment relative to the force-transmitting gear segment.

The combination described in the immediately preceding paragraph functions as a highly effective and efficient mechanical amplifier. A relatively slight mechanical force exerted on the trigger member can initiate the transmission of an indefinitely powerful rotational force on the pinion driving the force-transmitting gear segment. The operation of this mechanical amplifier is such that once it has been triggered it will transmit power until the end of its cycle and cannot be controlled through its trigger element until the full cycle has been completed.

BRIEF DESCRIPTION OF THE DRAWINGS

In the drawings:

FIG. 1 is a view in front elevation of a sensor control embodying the present invention with portions broken away to reveal internal functioning structure, FIG. 2 is an exploded view in perspective of an output gear assembly from the sensor control shown in FIG. 1, FIG. 3 is an exploded view in perspective of the output gear assembly shown in FIGS. 1 and 2, as viewed from the bottom of FIG. 2, FIG. 4 is an exploded diagrammatic view of the gear trains and assemblies in the sensor control shown in FIG. 1, and FIG. 5 is an exploded view of the rotary control assembly employed in the sensor control shown in FIG. 1.

DESCRIPTION OF THE PREFERRED EMBODIMENT

The present invention has been found to be particularly useful in a sensor control for a water softener system. Advantages of the present invention will be more fully appreciated as its operation in a sensor control is understood.

As can be seen in FIG. 1, the mechanism of the sensor control is enclosed in a rectangular housing 1, the cover (not shown) of which is removed to reveal the mechanism. The rectangular housing 1 would be mounted on top of a water softener tank on the end of a valve control assembly such as is shown in my copending application, Ser. No. 739,539, filed June 24, 1968, now U.S. Pat. No. 3,580,615, and entitled "Softener Control Assembly," it being the function of the present mechanism to transmit driving force to the mechanism shown in that application for operating valves that control the flow of this water to be treated and of the regeneration fluid. Mounted to the bottom of the housing 1 by means of screws (not shown) is a sample sensing chamber 2, which is shown in section to reveal its interior, and which contains an ion sensitive resin 2a which shrinks when wetted with hard water.

The sample sensing chamber 2 is a hollow, rectangular-shaped object made of a section of plastic rectangular tubing forming the vertical sidewalls and molded plastic top and bottom members 21 and 23, respectively, which are assembled together by the mounting screws (not shown) that extend vertically through the corners of those three pieces and into the housing 1. A flexible sampling tube 3 is suspended by a threaded sleeve 4 on a tubular fitting 4a that protrudes from the bottom of the sample sensing chamber 2, and the sampling tube 3 passes through an adjustable gripping seal 5 that is screw mounted in an upper wall 6 of a water softener tank. A weighted intake nozzle 10 is fastened on the end of the sampling tube 3 that is suspended in a bed of softener ion exchanger (not shown) inside the softener tank. An exhaust tubing 7 is fastened by a threaded sleeve 8 to a tubular fitting 8a that protrudes from the bottom of the sample sensing chamber 2 on the opposite side from the sampling tube 3.

A valve assembly 11 normally closes the mouth of the sampling tube 3 and has a valve stem 12 that extends upward out of the sample sensing chamber 2. Inside the sensing chamber 2 a vertical tube 13 which is vented with a plurality of vertically spaced transverse slots or openings houses a needle 14 on the end of the valve stem 12. A pair of O-ring seals 15 and 16 are fixed in annular seats at opposite ends of the tube 13. The valve stem 12 is sealed through the upper O-ring 16, and the needle 14 is inserted snugly through the lower O-ring to close the valve assembly 11. To open the valve assembly 11, the valve stem 12 is lifted, withdrawing the needle 14 from the lower O-ring 16. A vertical drain tube 24 that is vented with a plurality of transverse slots or openings extends from the inner mouth of the tubular fitting 8a which opens outwardly into the exhaust tubing 7, to the ceiling of the interior of the chamber 2. Thus, fluids introduced to the chamber 2 through the valve assembly 11 will tend to flow horizontally across the chamber 2 into the vertical drain tube 24 and then down into and out through the exhaust tubing 7.

A flexible diaphragm 17 extends across and seals the top of the interior of the sample sensing chamber 2. The diaphragm 17 is a soft, rubber membrane that is sealed about its peripheral edges between the tops of the lateral walls and the top piece 21 of the sample sensing chamber 2 and it passes beneath a mechanical sensor in the form of a plunger 18, to which it is screw fastened. A compression spring 19 urges the plunger 18 downwardly. One end of the compression spring 19 bears against a spring seat 20 in the plunger 18, and the other end of which bears against the top 21 of the sample sensing chamber 2. A plug 22 is screw fitted in an opening through the floor piece 23 of the sample sensing chamber 2 so that the sample sensing chamber 2 may be opened without dismantling it.

The mechanism shown in the rectangular housing 1 in FIG. 1 is most easily described using the exploded diagram in FIG. 4. An electric low-speed drive motor 25 is mounted on the outside surface (not Shown) on a backwall 26 of the rectangular housing 1 to provide a power source for the entire mechanism of the sensor control, and its drive shaft 27 projects through a bearing (not shown) in the backwall 26 of the rectangular housing 1. The drive shaft 27 has a main drive pinion 28 mounted on it adjacent the inside surface of the backwall 26, and the shaft 27, and pinion 28 are continuously driven by the motor 25. The main drive pinion 28 simultaneously drives four gear trains 29, 30, 31 and 32, which share some common elements, though each train 29-32, performs a specific end function distinct from the others.

The sampling gear train 29 has a spur gear 33 engaged with the main drive pinion 28 with a reduction pinion 34 formed on its hub. The reduction pinion 34 drives a second spur gear 35 that has a reduction pinion 36 on its hub, which simultaneously drives two spur gears 37 and 38, the latter gear 38 operating only in the sampling return gear train 30. The spur gear 37 that is driven by the reduction pinion 36, has a reduction pinion 39 on its hub, and this reduction pinion 39 engages a drive gear segment 40 that forms a part of a rotary control assembly 41, which is illustrated in an exploded view in FIG. 5.

The sampling return gear train 30 shares the spur gears 33 and 35 and their respective reduction pinions 34 and 36 with the sample gear train 29, and has in addition the mentioned spur gear 38 with an extended hub 42 that has a pinion 43 formed on top of it. The extended hub 42 of the return spur gear 38 passes through the hollow center of an annular hub 44 that is formed on the drive gear segment 40. The sampling return spur gear 38 is rotatably mounted on the backwall 26 of the rectangular housing 1 and it rotatably supports the drive gear segment 40 on an annular collar 45 that is formed on the upper surface of the spur gear 38.

The rotary control assembly 41 is, among other things, a unique form of rotary mechanical amplifier. In addition to the drive segment 40, referred to above, the rotary control assembly 41 also includes a trigger gear segment 46 that has for a hub an annular ring 47, which fits rotatably about the hub 44 of the drive gear segment 40. The drive segment 40 is a circular gear segment 40, the ends of which are separated by a short gap 48, and the trigger segment 46 is provided with a shorter gear segment 46 that has the same pitch diameter and tooth configuration as the drive gear segment 40. A circular bias spring 49 fits around the annular ring 47 of the trigger segment 46 and has one end hooked about a hook 50 projecting from the drive segment 40 and its other end hooked on a hook 50a projecting from a trigger segment 46. A pair of limit arms 51 project radially from the hub 44 of the drive segment 40 through slots 113 in the tubular hub 47 of the trigger segment 46 to limit the rotational movement of the trigger segment 46 with respect to the drive segment 40, and the arms, incidentally, also restrain the bias spring 49 axially to hold it in place. This assembly utilizes the functional elements mutually to restrain each other so that no additional screws, rivets or other assembly members are needed. The tension of the bias spring 49 is such and the hook 50 on the drive segment 40 and hook 50a on the trigger segment 46 are so located that the trigger segment 46 is normally biased to a position immediately adjacent to one end of the gap 48 between the ends of the drive segment 40. The trigger segment 46 has a trigger member 52 projecting horizontally from it, as viewed in FIG. 1, and a radial trigger member 53 extending outwardly from it. When the drive segment 40 is at rest with the pinion 39 turning freely in the gap 48 between its ends, either the trigger member 52, or the trigger member 53 may be engaged to overcome the bias spring 49 and rotate the trigger segment 46 into the gap 48 between the ends of the drive segment 40.

The slots 113 define the amount of movement of the trigger segment 46 relative to the drive segment 40, and when one of the triggers 52 or 53 moves the trigger segment 46, it moves the trigger segment 46 to the limit of its relative motion. Thus the trigger segment 46 has two positions relative to the drive segment 40, one at each end of its relative motion, and in each it is in alignment with the drive segment 40. When the trigger segment 46 a position wherein it spans the gap 48, it engages the reduction pinion 39 on the spur gear 37, which will rotate the drive segment 40 by means of the trigger segment 46 until the reduction pinion 39 is in direct driving engagement with the drive segment 40. Then the trigger segment 46 can be released and rotated back to its normal position by the bias spring 49. A relief slot 116 is cut in the trigger gear segment 46 to allow the trigger segment 46 to flex. Since the trigger segment is made of a resilient plastic, it can thus be formed to flex under strain. Hence, if the trigger segment 46 is not in perfect alignment with the drive gear segment 40, preventing the drive pinion 39 from meshing immediately with it, the gear teeth will not be damaged. This permits much larger tolerances in the manufacturing specifications with resulting reductions in costs.

A semicircular collar 54 extends axially from the top end of the hub 44 on the drive segment 40 and on one end of the collar 54 an arcuate gear segment 55 is formed. A linearly reciprocably slidable cam member 56 is located adjacent to the collar 54 and it has a linear gear rack 57 on its upper surface that can be engaged by the arcuate gear segment 55 on the collar 54 as the collar 54 rotates with the drive segment 40. When the arcuate gear segment 55 engages the linear gear rack 57 on the cam member 56, it drives the cam member 56 to the left, as viewed in FIG. 1, and the linear gear rack 57 is held into engagement with the arcuate gear rack 55 by an extension spring 58, one end of which is fastened to the end of the cam member 56 and the other end of which is anchored to a post 59 projecting from the backwall 26 of the housing 1. After the arcuate gear segment 55 has been rotated out of engagement with the linear gear rack 57 on the cam member 56, the linear gear rack 57 rides on the smooth surface of the collar 54 until the end of the collar 54 is rotated past it. When the collar 54 thus releases the linear gear rack 57, the rack 57 is pulled into engagement with the counter rotating pinion 43 on the top of the hub 42 of the return spur gear 38, which drives the cam member 56 back to its extreme position on the right.

The rotating arcuate gear segment 55 with the concentric, counterrotating return pinion 43, both being driven from a common source through separate gear trains 29 and 30, present a highly flexible mechanism for effecting reciprocating motion with maximum efficiency. In this embodiment this mechanism is used primarily to effect a controlled return of the cam member 56, in lieu of utilizing a spring return or some other such additional force. However, the mechanism can provide, for example, tremendous mechanical force advantage in one direction with a very highspeed, light-force return. This would allow maximum utilization of energy during a working stroke with minimum loss on the return.

The output gear train 31 shares with the timing gear train 32 a spur gear 60, which is driven by the main drive pinion 28. The spur gear 60 has a reduction pinion 61 on its hub, and the reduction pinion 61 drives a second spur gear 62 which has a reduction pinion 63 on its hub. A circular output gear segment 64 is rotatably mounted in the housing 1, and it is engaged by the reduction pinion 63. The output segment 64 is part of a rotary output assembly 65 that is illustrated in exploded view in FIGS. 2 and 3.

The output gear segment 64 has an extended, hollow tubular hub 66 projecting axially out of the rectangular housing 1 with an indicator arrow 67 formed across its top surface and knurled grip portion 68 about its top end. The hollow hub 66 fits rotatably about a portion of a cylindrical journal bearing 69 that is anchored to the backwall 26 of the housing 1 and that projects from the backwall 26 into the housing 1. The journal bearing 69 rotatably mounts an output shaft 105. A compression spring 70 is seated in a spring seat 106 in the output shaft 105 and bears against the inside of the hub 66, which is restrained in its axial movement by the inside of a front wall (not shown) of the rectangular housing 1. The compression spring 70 tends to hold the output segment 64 into engagement with the reduction pinion 63 formed on the hub of the spur gear 62, so that the hub 66 of the output segment 64 may be manually depressed to release the output segment 64 which then may be manually rotatably adjusted free of engagement with the spur gear 62. Rectangular keys 106 and 107 extend radially from opposite sides of the output shaft 105 to slide in grooves 108 and 109 formed on the inside of the hub 66. Thus the rotational movement of the output gear segment 64 is transmitted to the output shaft 105, which conveys that movement through the journal bearing 69 outside of the housing 1 to the mechanism (not shown), such as that disclosed in the copending application, Ser. No. 739,539, filed June 24, 1968, and entitled "Softener Control Assembly."

The rotary output assembly 65 embodies the same type of unique rotary mechanical amplifier as the rotary control assembly 41. Hence, what has been said of the operation and capabilities of the control assembly 41 applies as well to the corresponding structure in the output assembly 65. The output segment 64 is a circular gear segment 64 with a small gap 71 between its ends. A trigger gear segment 72, which also is a circle segment 72 and which has the same pitch diameter and gear configuration as the output segment 64, has an annular ring 73 for a hub that forms a rotating fit about the hub 66 on the output segment 64. A circular bias spring 74 fits about the annular ring 73, and one of its ends engages a hook 75 on the trigger segment 72 and the other end is anchored to a hook 75a on the output segment 64. The bias spring 74 is restrained beneath a pair of limit arms 76 that radiate from the hub 66 of the output segment 64 through slots 77 in the annular ring 73 above the trigger segment 72, and the limit arms 76 serve to limit the amount of relative rotational movement of the trigger segment 72 with respect to the output segment 64. A trigger 78 projects from the trigger segment 72 so that it may be engaged by some external device to rotate the trigger segment 72 relative to the output segment 64 against the bias spring 74. Normally the trigger segment 72 is held adjacent to one end of the gap 71 that is provided between the ends of the output gear segment 64, but when the trigger segment 72 is actuated by engaging the trigger 78, the trigger segment 72 rotates into a position above the gap 71 so that the reduction pinion 63 can mesh with the trigger segment 72 and, through the trigger segment 72, drive the output segment 64 until it meshes directly with the output gear segment 64. When the pinion 63 is enmeshed with the output segment 64 the trigger segment 72 is released to return to its normal position. The trigger segment 72 is provided with a relief slot 115 that corresponds in structure and function to the relief slot 116 in the trigger gear segment 46 of the control assembly 41.

The sensing plunger 18 in the sample sensing chamber 2 shown in FIG. 1 has a rod 79 extending from it and projecting out of the sample sensing chamber upwardly into the housing 1. An arm 80 extends from the end of the rod 79 and has a latch 81 on its upper end that is positioned adjacent to the tubular ring 73 with the latch 81 being disposed above the trigger 78 of the output trigger gear segment 72, as viewed in FIG. 1. Thus the latch 81 will reciprocate with the plunger 18 to move into and out of the path of the trigger 78 on the trigger gear segment 72. A cam follower 82 projects outwardly from the arm 80 on the rod 79 of the plunger 18 to ride on a cam surface 83 over the top of the cam member 56. The left end of the cam surface 83 is relatively low but it rises sharply to the right before leveling off, so that as the cam member 56 is driven to the left the plunger 18 is hoisted to the top of its stroke in the sample sensing chamber 2 and the latch 81 is positioned above the trigger 78 on the trigger gear segment 72. When the cam member 56 moves to its sensing position at the extreme right, the cam surface 83 releases the cam follower 82 and the plunger 18, which is then driven downward by the compression spring 19. If the movement of the plunger 18 in the chamber 2 is not obstructed, the latch 81 will engage the trigger 78 and pull the trigger gear segment 72 against the bias spring 74 into a position wherein it spans the gap 71 between the ends of the output gear segment 64 to engage the reduction pinion 63.

The last gear train to be described is the timing gear train 32. The timing gear train 32, as was mentioned, shares the spur gear 60 and reduction pinion 61 with the output gear train 31, and the reduction pinion 61 drives a first spur gear 84. A reduction pinion 85 on the hub of the first spur gear 84 engages a second spur gear 86, which also has a reduction pinion 87. The reduction pinion 87 on the second spur gear 86 engages a third spur gear 88 to drive a timing gear 89 through a reduction pinion 90 on the hub of the third spur gear 88. The timing gear 89 makes one revolution each 24 hours, and it is mounted to be manually set to the time the mechanism is put into operation. An annular collar 91 is mounted on the under side of the timing gear 89, and on one end of the annular collar 91 an extension 92 projects approximately radially outwardly toward the periphery of the timing gear 89. This redial extension 92 of the annular collar 91 is shaped and positioned so that it can engage the trigger 52 projecting from the trigger segment 46 in the control assembly 41 to drive the trigger segment 46 so that the gear segment thereof is positioned across from the gap 48 that is provided between the ends of the drive gear segment 40. The resulting rotation of the drive segment 40, as has been described, drives the cam member 56, which controls the sensing and sampling of the water being treated in the softener tank 6.

The sampling valve assembly 11 has a rectangular extension portion 93 on the valve stem 12 that has a guide slot 94 in it, through which a guide post 110 projecting from the backwall 26 of the housing 1 extends to guide its reciprocating travel. On the end of the extension 93 of the valve stem 12 a cam follower 95 projects outwardly through a slotted cam groove 96 in the cam member 56. The left two-thirds of the slot cam groove 96 is horizontal, but in the right one-third, the cam groove 96 rises sharply to a brief plateau at the right end, so that as the cam member 56 moves to the left, the valve stem 12 and needle 14 are raised rapidly during the last third of its travel to open the sampling valve assembly 11. This allows a sample of fluid from the sampling tube 3 to enter the sample sensing chamber 2 while the plunger 18 is lifted to its highest position.

OPERATION

To set forth the operating cycle in logical sequence, start with the drive gear 40 of the rotary control assembly 41 rotated to a position where the pinion 39 is turning freely in the gap 48 between the ends of the drive segment 40 and the drive segment 40 is stationary. Also begin with the output segment 64 rotated to a stationary position where the pinion 63 is turning freely in the gap 71 between the ends of the output gear segment 64. Finally, assume that the trigger gear segment 46 in the rotary control assembly 41 and the trigger segment 72 in the rotary output assembly 65 are resting in their normal positions.

As the drive motor 25 drives the four reduction gear trains 29, 30, 31, and 32, only one of the reduction gear trains, the timing gear train 32, is performing a function at all times and it is rotating the timing gear 89 at a rate that provides one complete revolution every 24 hours. Most of the time the other three gear trains 29–31, viewed in terms of an ultimate accomplishment, are simply idling. Assume that the collar 91 with its radial extension 92 on the timing gear 89 is positioned to initiate a sampling at 2 o'clock in the morning. For purposes of description, assume that the operation begins moments before 2 a.m. The radial extension 92 of the collar 91 would be seen to approach engagement with the trigger 52 on the trigger gear segment 46 of the rotary control assembly 41. As the timing gear 89 continues to move past 2 a.m., the radial extension 92 of the collar 91 engages the trigger 52 and drives the trigger gear segment 46 into a position wherein it spans the gap 48 between the ends of the drive segment 40 where it is engaged by the rotating pinion 39. When the control drive pinion 39 drives the trigger segment 46, the trigger segment 46 pulls the drive segment 40 into engagement with the pinion 39, which then directly drives the drive segment 40 rotating it until the pinion 39 again reaches the gap 48. As the drive segment 40 rotates, the arcuate gear segment 55 on the collar 54 projecting from the top of the hub 44 of the drive segment 40, which was already engaged with the rack 57 on the top of the cam member 56, drives the cam member 56 to the left in the drawing, and then rotates past engagement with the linear cam rack 57 so that the cam rack 57 rests on the collar 54.

With the cam member 56 driven to its left most position, the cam follower 95 on the extension 93 of the valve stem 12 has followed the cam groove 96 to its highest point, lifting the valve stem 12 and the needle valve 14 to open the valve 11 to allow a sample of water from the softener tank 6 to flow up through the sampling tube 3 into the tube 13 in the sample sensing chamber 2. The water sample is sprayed out of the tube 13 through its vertically spaced openings and it thoroughly washes and agitates the sensing ion exchanger 2a as it flows across the chamber 2 and enters the drain tube 24 through its many vertically spaced openings to flow out of the chamber 2. After the collar 54 has rotated past the linear rack 57, the meshing spring 58 draws the rack 57 into engagement with the cam return pinion 43, which, rotating in the opposite direction from the drive segment 40 of the control assembly 41, drives the cam member 56 back to the right end of its stroke.

This return of the cam member 56 to the right end of its stroke forces the cam follower 95 on the extension 93 of the valve stem 12 downward, driving the end of the needle valve 14 through the O-ring 15 to close the sample intake valve assembly 11. As the cam member 56 reaches the right end of its reciprocating travel, the cam surface 83 drops off sharply, releasing the cam follower 82 on the shaft 80 of the sensing plunger 18, allowing the compression spring 19 to drive the plunger 18 down against the resin 2a within the sampling chamber 2. If the sample of water from the softener tank 6 that wets the cation exchange resin 2a in the chamber 2, is soft, the cation exchange resin 2a will manifest its normal maximum volume and the travel of the plunger 18 into the sensing chamber 2 will be obstructed and stopped. However, if the water sample is hard, the cation exchange resin 2a will shrink allowing the plunger 18 to drop under the impetus of the compression spring 19 to the bottom of its stroke.

When the output segment 64 is in the position specified so that its drive pinion 63 is rotating freely in the gap 71 between the ends of the output gear segment 64, the horizontally extending trigger 78 on the trigger segment 72 is in the position shown in FIG. 1 immediately beneath the latch 81. Hence, when the plunger 18 is allowed by the shrunken resin 2a in the chamber 2 to drop down, the latch 81 engages the trigger 78 pulling it downwardly with the force of the compression spring 19 to drive the trigger segment 72 into its actuated position in the gap 71 between the ends of the output gear segment 64 so that it can engage the output drive pinion 63. The output drive pinion 63 then begins to rotate the output segment 64, first through the trigger segment 72 and then directly as it comes in mesh with the output gear segment 64.

Meanwhile, the drive segment 40 of the control assembly 41 has continued its rotation under the impetus of the pinion 39, until it brings the arcuate segment 55 back into engagement with the linear rack 57 on the cam member 56 and drives the cam member 56 to the left sufficiently to cause the cam follower 82 to ride upwardly on the output cam surface 83. The movement of the follower 82 on the cam surface 83 lifts the plunger 18 from the top of the cation exchange resin 2a in the chamber 2. Thus as soon as the cam member 56 has been driven sufficiently far to the left to thus raise the plunger 18, the drive segment 40 of the control assembly 41 completes one rotation with the pinion 39 once again turning freely in the gap 48 between the ends of the drive segment 40.

While the drive segment 40 of the control assembly 41 is returning the cam 56 to its normal, central position to hold the plunger 18 off of the sensing ion exchanger 2a, the output segment 64 on the output gear assembly 65 is rotating, transmitting the drive force of the motor 25 to the control mechanism of the mentioned copending application, Ser. No. 739,539, filed on June 24, 1968, and entitled "Softener Control Assembly" which closes the valves for the hard water flow, and opens the valve to initiate the flow of brine through the softener ion exchanger (not shown) to regenerate it. By the time the output segment 64 has been rotated approximately 90°, the drive segment 40 has completed its rotation and its trigger member 53 is projecting radially over the top of the output segment 64. At this point in time, a horizontally extending actuator 114 projecting outwardly from the output segment 64, as viewed in FIG. 1, strikes the radially extending trigger member 53 on the trigger segment 46 of the control assembly 41 the output segment 64 continues to rotate, the actuator 114 drives the trigger segment 46 of the control assembly 41 into its actuated position across the gap 48 between the ends of the drive segment 40 to engage the rotating control drive pinion 39, which then begins to drive the drive segment 40 through a second rotation.

As the drive segment 40 rotates, the arcuate segment 55 on the collar 54 projecting from the hub 44, which is in engagement with the cam rack 57 on the cam member 56, drives the cam member 56 to its left end position, where it is held by the collar 54 after the arcuate segment 55 has rotated past engagement with the cam rack 57. When the cam member 56 is in that extreme left most position of its reciprocating movement, the sampling intake valve assembly 11 is opened again and the plunger 18 is lifted to the top of its stroke so that it can exert no pressure on the cation exchange resin 2a within the sample sensing chamber 2.

The cam member 56, after opening the valve 11 returns to the opposite extreme of its reciprocating movement, so that it is to the far right in the drawing. The drive segment 40 of the control mechanism 41 continues rotating until the arcuate segment 55 once again engages the linear cam rack 57 on the cam member 56 and drives the cam member 56 from the right-hand extreme of its reciprocating movement back to its normal central position. At that point, the gap 48 between the ends of the drive segment 40 again reaches the control drive pinion 39 to halt the rotation of the drive segment 40, thus ending the entire operating cycle and holding the control mechanism 41 in its normal position until the timing gear 89 initiates the next sampling.

Viewed in a more general context, the control segment 40 and the output segment 64 become power-transmitting gear segments 40 and 64 and the respective trigger segments 46 and 72 are responsive to mechanical input signals to initiate transmission of power by the power-transmitting segments 40 and 64. For the control assembly 41, the input signal is a timing pulse periodically emitted by the timing gear 89 and the output segment 64. For the output assembly 65, the input signal is an error feedback signal from the plunger 18 indicating that the treated water at a preset level in the softener bed does not manifest the desired condition. Both input signals are or may be relatively weak and the output power-transmitting to the output means, i.e., the output shaft 105 and the cam member 56, by the power-transmitting segments is, or may be, very great. The cam member 56 also normally holds the plunger 18 out of engagement with the sensing resin 2a so that the sensing ion exchanger 2a can seek its proper volume and will not be damaged.

The embodiment just described represents the best mode presently contemplated by the inventor for carrying out this invention. However, other embodiments will be developed to meet the needs of other systems and still more embodiments are possible that may not be practiced. Hence, the invention is not to be confused with a specific embodiment of it. The invention itself is particularly pointed out in the claims that follow.

I claim:

1. A mechanical rotary power transmission responsive to a control signal for intermittently providing mechanical output power, the combination comprising a rotary power source driving a pinion;

a rotary assembly including a power-transmitting gear segment having a gap between its ends and being in driving engagement with said pinion, a trigger gear segment mounted coaxially on said power-transmitting gear segment to rotate with said power-transmitting gear segment and for limited rotation relative to said power-transmitting gear segment and adapted for driving engagement with said pinion, said trigger gear segment being normally positioned adjacent said gap and having a trigger member projecting from it to receive an input signal to rotate said trigger gear segment relative to said power transmission gear segment into said gap to mesh with said pinion;

and an input signal means adjacent to said trigger gear segment to rotate said trigger gear segment relative to said power-transmitting gear segment to engage said pinion.

2. A mechanical rotary power transmission as set forth in claim 1 wherein said power-transmitting gear segment is a circular gear segment having an axially projecting hub;

and said trigger gear segment has substantially the same pitch diameter and tooth configuration as said power-transmitting gear segment and has an annular ring hub rotatably mounted about said axially projecting hub of said power-transmitting gear segment.

3. A mechanical rotary power transmission as set forth in claim 2, wherein a circular bias spring is mounted about said annular ring hub of said trigger gear segment and has one end hooked to said trigger gear segment and another end hooked to said power transmission gear segment to bias said trigger gear segment to a normal position adjacent to said gap.

4. A mechanical rotary power transmission as set forth in claim 1 wherein said power-transmitting gear segment is drivingly connected to means for receiving output power from rotation of said power-transmitting gear segment.

5. A mechanical rotary power transmission as set forth in claim 4, wherein said power-transmitting gear segment is keyed to an output shaft.

6. A mechanical rotary power transmission as set forth in claim 4, wherein said power-transmitting gear segment has an axially projecting hub with gear teeth on it to drivingly engage a rack on an adjacently mounted member.

7. A mechanical rotary power transmission as set forth in claim 1, wherein said trigger gear segment is spring biased to a normal position adjacent to said gap.

* * * * *